United States Patent [19]

Muench et al.

[11] Patent Number: 4,618,636
[45] Date of Patent: Oct. 21, 1986

[54] FLAMEPROOFED THERMOPLASTIC MOLDING MATERIAL COMPRISING A NOVOLAK RESIN

[75] Inventors: Volker Muench, Ludwigshafen; Juergen Hambrecht, Heidelberg; Herbert Naarmann, Wattenheim; Adolf Echte, Ludwigshafen; Karl H. Illers, Otterstadt, all of Fed. Rep. of Germany

[73] Assignee: BASF Aktiengesellschaft, Ludwigshafen, Fed. Rep. of Germany

[21] Appl. No.: 692,621

[22] Filed: Jan. 18, 1985

[30] Foreign Application Priority Data

Jan. 20, 1984 [DE] Fed. Rep. of Germany ....... 3401834

[51] Int. Cl.$^4$ .................... C08K 3/10; C08K 5/51; C08K 5/13; C08L 61/10
[52] U.S. Cl. .................... 524/176; 524/151; 524/339; 524/405; 524/430; 524/431; 524/432; 524/504; 524/509
[58] Field of Search .......... 524/504, 509, 176, 405, 524/430–432, 151, 339

[56] References Cited

U.S. PATENT DOCUMENTS

| | | | |
|---|---|---|---|
| 3,474,065 | 10/1969 | Gburek | 524/509 |
| 3,909,463 | 9/1975 | Hartman | 525/138 |
| 3,983,086 | 9/1976 | Dickens | 524/176 |
| 4,035,447 | 7/1977 | Tonoki et al. | 524/565 |
| 4,051,105 | 9/1977 | Anderson et al. | 525/565 |
| 4,094,834 | 6/1978 | Bowers et al. | 524/509 |
| 4,260,704 | 4/1981 | Schmidt et al. | 524/509 |
| 4,316,968 | 2/1982 | Girgis | 524/509 |
| 4,316,969 | 2/1982 | Koyama et al. | 524/509 |
| 4,400,495 | 8/1983 | Shutov et al. | 524/176 |
| 4,456,720 | 6/1984 | Abolins et al. | 524/176 |
| 4,476,277 | 10/1984 | Koyama et al. | 524/504 |

FOREIGN PATENT DOCUMENTS

| | | |
|---|---|---|
| 3003193 | 8/1981 | Fed. Rep. of Germany . |
| 3316302 | 11/1984 | Fed. Rep. of Germany . |
| 0187418 | 4/1982 | Japan . |
| 0055930 | 4/1982 | Japan . |
| 2054610 | 2/1981 | United Kingdom . |

*Primary Examiner*—Herbert J. Lilling
*Attorney, Agent, or Firm*—Keil & Weinkauf

[57] ABSTRACT

A flameproofed thermoplastic molding material consists of

A. a thermoplastic resin containing a vinylaromatic monomer and furthermore contains B. from 0 to 100 parts by weight of an elastomer having a glass transition temperature Tg 0° C., as an impact modifier, C. from 2 to 50 parts by weight of a halogen-containing organic compound (flameproofing agent), D. from 0.5 to 20 parts by weight of a compound containing a metal or non-metal (synergistic agent) and E. from 5 to 50 parts by weight of a novolak (phenol-/aldehyde resin).

The novolak is obtained from an aldehyde of the formula (I)

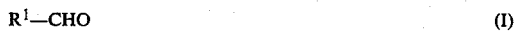

where $R^1$ is H, $C_1$–$C_{10}$-alkyl, cycloalkyl, $C_6$–$C_{12}$-aryl or ω-aryl-$C_1$–$C_3$-alkyl, and a mixture of phenols, and this mixture contains two or more monosubstituted phenols and the substituents can be alkyl of 1 to 8 carbon atoms or CN.

The molding material is used for the production of flameproofed moldings.

16 Claims, No Drawings

FLAMEPROOFED THERMOPLASTIC MOLDING MATERIAL COMPRISING A NOVOLAK RESIN

The present invention relates to a flameproofed thermoplastic molding material which consists of A. one or more thermoplastic resins containing a vinylaromatic monomer, and furthermore contains B. from 0 to 100 parts by weight of an elastomer having a glass transition temperature Tg<0° C., as an impact modifier, C. from 2 to 50 parts by weight of one or more halogen-containing organic compounds (flameproofing agents), D. from 0.5 to 20 parts by weight of a compound containing a metal or non-metal (synergistic agent) and E. from 5 to 50 parts by weight of a novolak (phenol-/aldehyde resin), the amounts in each case being based on 100 parts by weight of A.

The flameproofing of thermoplastics is known, and is described in, for example, (1) Vogel, "Flammfestmachen von Kunststoffen", Hüthig Verlag (1966), pages 94–102,
(2) Troitzsch, "Brandverhalten von Kunststoffen", Hanser Verlag (1982), pages 1–65, and
(3) Hirschler, in "Developments in Polymer Stabilization", Volume 5, Editor G. Scott, Applied Science Publishers, London (1982), pages 107–151.

For example, it has been disclosed that, when relatively large amounts of flameproofing agents are employed and conventional synergistic agents are concomitantly used, the thermoplastics, after being ignited with a hot flame, drip non-flaming particles and are self-extinguishing [cf. for example German Laid-Open Application Nos. DOS 2,328,517 and DOS 2,541,256]. It is also known that, in the absence of a synergistic agent, this effect takes place only after a much larger amount of a flameproofing agent has been added. Molding materials treated in this manner possess disadvantages which in general are unacceptable to the processor. Typical examples are the discoloration of the molding material and the corrosion of processing apparatuses when combinations of halogen-containing flameproofing agents and synergistic agents are used. Without the use of synergistic agents, the amount of flameproofing agent has to be increased, and this has a very adverse effect on the mechanical properties of the thermoplastics thus treated and, because of a substantial reduction in the heat distortion resistance, results in the dripping of flaming particles. These problems can therefore only be solved by reducing the amount of halogen-containing flameproofing agents, while the thermoplastics then frequently no longer qualify for classification as UL 94 V0 or UL 94 V1.

Various attempts have therefore been made completely or partially to replace halogen-containing flameproofing agents and the associated synergistic agents in thermoplastic materials by other flame-retardant substances.

The relevant prior art includes British Pat. No. 2,054,610.

This publication describes mixtures of toughened thermoplastics based on styrene, halogen-containing flameproofing agents, synergistic agents and hydrocarbon/formaldehyde resins. According to the authors, the use of novolaks instead of the hydrocarbon/formaldehyde resins is supposed to give virtually no improvement in the flame-retardant characteristics, so that there are no substantial overall advantages compared with the conventional flameproofing treatment (cf. page 2, 3rd paragraph).

It is an object of the present invention to reduce the amount of halogen-containing flameproofing agents in vinylaromatic-containing thermoplastic molding materials flameproofed with combinations comprising flameproofing agents and synergistic agents, without the molding material failing to qualify for classification as UL 94 V1 or UL 94 V0. At the same time, the intention is to prevent dripping of the mixture when a flame is applied and during subsequent flaming combustion.

We have found that this object is achieved by a molding material as claimed in claim 1.

The present invention therefore relates to a flameproofed thermoplastic molding material which consists of A. one or more thermoplastic resins containing a vinylaromatic monomer, and furthermore contains B. from 0 to 100 parts by weight of one or more elastomers having a glass transition temperature Tg<0° C., as an impact modifier, C. from 2 to 50 parts by weight of one or more halogen-containing organic compounds (flameproofing agents), D. from 0.5 to 20 parts by weight of one or more compounds containing a metal or non-metal (synergistic agents) and E. from 5 to 50 parts by weight of a novolak (phenol-/aldehyde resin), the amounts in each case being based on 100 parts by weight of A.

In the molding material, the novolaks used are obtainable from aldehydes of the general formula (I)

$$R^1—CHO \qquad (I)$$

where $R^1$ is H, $C_1$–$C_{10}$-alkyl, cycloalkyl, $C_6$–$C_{12}$-aryl or ω-aryl-$C_1$–$C_3$-alkyl, and mixtures of phenols, these mixtures containing two or more monosubstituted phenols, where the substituents can be alkyl of 1 to 8 carbon atoms or CN.

The composition of the novel molding material in terms of the components A to E, the type and preparation of these components, and the preparation of the molding material are described below.

The molding material according to the invention consists of various components A, C, D and E and can, if required, also contain an impact modifier, component B. Regardless of whether the molding material consists of 4 or 5 components, it can also contain effective amounts of conventional additives (component F).

The novel molding material consists of from 0 to 100, preferably from 5 to 30, in particular from 6 to 25, parts by weight of component B, from 2 to 50, preferably from 4 to 40, in particular from 4 to 25, parts by weight of component C, from 0.5 to 20, preferably from 1 to 15, in particular from 2 to 10, parts by weight of component D and from 5 to 50, preferably from 5 to 40, in particular from 10 to 30, parts by weight of component E, the amounts in each case being based on 100 parts by weight of component A.

COMPONENT A

Component A of the novel molding material should comprise one or more commercial thermoplastic resins. These resins can be homopolymers or copolymers of a thermoplastic, and mixtures of different thermoplastics, which are listed below, can also be used. Suitable thermoplastics are polyethylene, polypropylene, polyisobutylene, polystyrene, copolymers of styrene with acrylonitrile, with maleic anhydride, with maleates and with acrylates, copolymers of acrylonitrile with α-methylstyrene, and nylons, polyesters and polyurethanes.

Polystyrenes ($A_1$) are preferably used, and, in order to improve the heat distortion resistance, some or all of the styrene component ($a_1$) can be replaced with styrene which is alkylated in the nucleus, in particular p-methylstyrene. Copolymers of styrene with acrylonitrile ($a_2$), maleic anhydride, maleates and acrylates are particularly preferably used.

For the preparation of the novel molding materials, styrene/acrylonitrile copolymers ($A_2$) are very particularly preferably used; these essentially consist of from 1 to 50% by weight of acrylonitrile ($a_2$) and from 50 to 99% by weight of styrene ($a_1$). In order to improve the heat distortion resistance, some or all of the styrene component can be replaced with styrene which is alkylated in the nucleus, in particular p-methylstyrene. Styrene/acrylonitrile copolymers are available commercially and can be prepared, for example, as described in German Published Application No. DAS 1,001,001 or German Pat. No. 1,003,436. The molecular weight $M_w$ of the copolymers can be from $10^5$ to $2.5 \times 10^5$ (weight average molecular weight from light scattering).

COMPONENT B

The elastomer used for toughening the novel molding materials can be an ungrafted rubber ($B_1$) or a grafted rubber ($B_2$).

The rubber ($B_1$) should have a glass transition temperature (according to K. H. Illers and H. Breuer, Kolloid Zeitschrift 176 (1961), 110) of less than 0° C. Examples of suitable rubbers are polybutadiene (cf. German Laid-Open Applications Nos. DOS 1,420,775 and DOS 1,495,089), copolymers of butadiene and styrene (cf. British Pat. No. 649,166), copolymers of butadiene and styrene, polyacrylates which may or may not be cross-linked (cf. German Published Applications Nos. DAS 1,138,921, DAS 1,224,486 or DAS 1,260,135) and copolymers of acrylates and butadiene (cf. German Published Application No. DAS 1,238,207), as well as elastomers of copolymers of acrylates with styrene, acrylonitrile and vinyl ethers, and copolymers of ethylene, propylene and a non-conjugated diene (EPDM rubber). Polybutadiene ($B_1$) is particularly preferred.

Suitable grafted rubbers ($B_2$) are graft copolymers, these being used in amounts of from 5 to 50, in particular from 10 to 45, % by weight, based on the mixture of A and B. The graft copolymers consist of from 10 to 50, preferably from 15 to 45, parts by weight of a mixture of one or more vinylaromatic monomers of not more than 12 carbon atoms, and from 0.1 to 25, preferably from 5 to 20, parts by weight of a (meth)acrylate and/or of acrylonitrile, as a grafted shell, on from 50 to 90, in particular from 60 to 80, % by weight of an elastomeric grafting base (rubber component).

The vinylaromatic graft monomers are styrene, α-methylstyrene and/or styrenes of not more than 12 carbon atoms which are alkylated in the nucleus; suitable monomers are (meth)acrylates of alkanols of not more than 8 carbon atoms, acrylonitrile and mixtures of these. Graft copolymers of S/AN on polybutadiene (ABS) or on polyacrylate (ASA) are preferred.

The preparation of the graft copolymers ($B_2$) is known per se. They can be prepared, for example, by polymerization of a mixture of styrene and acrylonitrile and/or (meth)acrylates in the presence of a rubber ($B_1$).

Suitable graft rubbers ($B_2$) are therefore:

$B_{2a}$
 75% of polybutadiene rubber grafted with
 25% of styrene/acrylonitrile in a ratio of 90:10

$B_{2b}$
 75% of polybutadiene rubber grafted with
 25% of styrene/acrylonitrile in a ratio of 83:17

$B_{2c}$
 75% of polybutatiene rubber grafted with
 25% of styrene/acrylonitrile in a ratio of 75:25

$B_{2d}$
 75% of polybutadiene rubber grafted with
 25% of styrene/acrylonitrile in a ratio of 70:30

$B_{2e}$
 75% of a rubber consisting of 60 parts of butyl acrylate, and 40 parts of butadiene, grafted with
 25% of styrene/acrylonitrile in a ratio of 70:30

$B_{2f}$
 75% of polybutadiene rubber grafted with
 25% styrene/acrylonitrile in a ratio of 70:30

$B_{2g}$
 60% of polybutadiene rubber grafted with
 40% of styrene/acrylonitrile in a ratio of 65:35

$B_{2h}$
 60% of a rubber consisting of butyl acrylate and dicyclopentadiene acrylate in a ratio of 98:2, grafted with
 40% of styrene/acrylonitrile in a ratio of 75:25, and $B_{2i}$
 75% of a rubber consisting of butyl acrylate, buta-1,3-diene and vinyl methyl ether in a ratio of 57:38.5:4.5, grafted with
 25% of styrene/acrylonitrile in a ratio of 70:30.

$B_{2g}$ is particularly preferably used.

Mixtures of components A and B which are particularly preferably used in the novel molding materials are accordingly impact-resistant styrene/acrylonitrile copolymers (SAN), acrylonitrile/butadiene/styrene block copolymers (ABS) and high impact polystyrene (HIPS), ie. component B is preferably used in the form of a graft copolymer of the monomers of which component A consists.

COMPONENT C

Suitable flameproofing agents, ie. component C of the novel molding material, are halogen-containing organic compounds which are described in the publications cited under (1), (2) and (3). Useful flameproofing agents from (1), (2) and (3) are octabromohexadecane, chlorinated paraffins which contain about 70% by weight of chlorine, halogen-containing Diels-Alder adducts and halogen-containing diphenyls.

For particular purposes, ie. in order to be able to avoid efflorescence, the styrene oligomers which are halogenated in the nucleus, contain from 40 to 80% by weight of halogen and have a mean degree of polymerization of from 3 to 200 are used. Their preparation is disclosed in, for example, German Laid-Open Application No. DOS 2,537,385.

In general, the organic bromine compounds, and among these the bis(tribromophenoxy)alkylenes (cf. German Laid-Open Application No. DOS 2,328,517), in particular bis(tribromophenoxy)ethane ($C_2$) are preferred, as are the octa-, nona- and decabromodiphenyls and the corresponding diphenyl ethers ($C_1$) and tetrabromobisphenol A ($C_3$). Mixtures of diphenyl ethers which are described in, for example, British Pat. No. 1,158,163 or German Published Application No. DAS 2,046,795 and are available commercially are particularly preferred.

The stated flameproofing agents can be employed alone or as a mixture with one another. Within the stated range, the value which is most advantageous for the particular thermoplastic used can readily be determined by a skilled worker.

COMPONENT D

Particularly suitable synergistic agents for the halogen-containing flameproofing agents in the novel molding materials are metal compounds, such as $As_2O_3$, $Sb_2O_3$, $Bi_2O_3$, $SnO_2$, $Fe_2O_3$, ferrocene, $Al_2O_3$, ZnO and mixtures of these, and non-metal compounds, such as hypophosphites and borates. $Sb_2O_3$ ($D_1$) is preferably employed.

COMPONENT E

Components E of the novel molding material are phenol/aldehyde resins which are prepared by condensation of phenols and aldehydes and are known as novolaks. Those having a number average molecular weight $\overline{M}_n$ of from 500 to 2,000 are particularly preferably used.

The preparation of novolaks is described in, for example, Houben-Weyl, Methoden der organischen Chemie, Volume 14, Part 2, Georg Thieme Verlag, Stuttgart, 1963, page 201 et seq., or in Sørensen and Campbell, "Preparative Methods of Polymer Chemistry", Interscience Publishers, New York, 1968; thermodynamic properties of novolak/polymer mixtures are given by Fahrenholtz and Kwei in Macromolecules, 14 (1981), 1076–1079.

Novolaks can be prepared using aldehydes of the general formula I $$R^1-CHO \qquad (I)$$

where $R^1$ is H, $C_1$–$C_{10}$-alkyl, cycloalkyl, $C_6$–$C_{12}$-aryl or ω-aryl-$C_1$–$C_3$-alkyl, eg. formaldehyde, acetaldehyde, n-propanol, n-butanal, isopropanal, isobutyraldehyde, 3-methyl-n-butanal, benzaldehyde, p-tolylaldehyde, 2-phenylacetaldehyde, etc. Furfurylaldehyde can also be used, and formaldehyde is particularly preferably employed.

Suitable compounds for reacting (condensing) with the aldehydes are phenol mixtures which contain two or more monosubstituted phenols.

Suitable monosubstituted phenols are o-cresol, m-cresol, p-cresol, p-tert.-butylphenol, p-octylphenol and o-cyanophenol, suitable substituents for the phenols therefore being alkyl radicals of 1 to 8 carbon atoms or CN. For the reaction with the aldehydes, binary phenol mixtures consisting of, for example, o- and m-cresol, or mixtures of one of these with p-tert.-butylphenol, p-cresol, p-octylphenol or p-cycanophenol are employed. Phenol mixtures consisting of three components, in particular mixtures of o-cresol, m-cresol and p-tert.-butylphenol or p-cresol, are most suitable and are therefore preferred. The composition of the mixture of the three phenols when used for the condensation with, in particular, formaldehyde can be from 20 to 80, in particular from 60 to 70, mol % for o-cresol, from 10 to 40, in particular from 15 to 20, mol % for m-cresol and from 10 to 40, in particular from 10 to 20, mol % for p-tert.-butylphenol or p-cresol, the percentages in each case being based on the mixture.

Examples of useful novolaks obtained from phenol mixtures ($E_2$) are listed in Table 1. The list serves as an illustration and does not impose any restriction. The exact composition is not critical and can vary within the stated limits. In calculating a composition, the sum of the percentages is 100.

TABLE 1

| Basic phenol and name of the novolak ( ) | | Novolaks obtained from phenol mixtures | | | | |
|---|---|---|---|---|---|---|
| | | m-cresol (mol %) | p-cresol (mol %) | p-tert.-butylphenol (mol %) | o-octylphenol (mol %) | p-cyanophenol (mol %) |
| o-cresol | ($E_{2b1}$) | 10–90 | — | 5–40 | — | — |
| o-cresol | ($E_{2b2}$) | 10–90 | — | 5–30 | — | 1–10 |
| o-cresol | ($E_{2b3}$) | 10–40 | — | 5–30 | 5–10 | 1–5 |
| o-cresol | ($E_{2b4}$) | 10–90 | 5–40 | — | — | — |
| m-cresol | ($E_{2c1}$) | — | — | 5–80 | — | — |
| m-cresol | ($E_{2c2}$) | — | — | 10–50 | 15–20 | 1–10 |
| p-tert.-butylphenol | ($E_{2d1}$) | — | — | — | 20–30 | 1–3 |

The mixed novolak $E_{2b1}$ or $E_{2b4}$ is particularly preferably used.

COMPONENT F

The novel molding materials can, if required, contain conventional additives (component F). Suitable additives are conventional, well-proven stabilizers, such as sterically hindered phenols and organic phosphites, which are used alone or together with one another. The amount of stabilizer or stabilizer mixture used should be from 0.01 to 0.5 part by weight per 100 parts by weight of component A.

Sulfur and/or sulfur-containing antioxidants, such as dithiocarbamate complexes, salts of xanthogenic acid, thiazoles and zinc salts of mercaptobenzimidazoles, can also be used, these being employed in conventional amounts of, in each case, from 0.01 to 0.5 part by weight per 100 parts by weight of A.

Fillers, colored pigments, lubricants, plasticizers, antistatic agents, blowing agents or other, metal-free synergistic agents, such as triphenyl phosphate or triphenylphosphine oxide, can furthermore be used in conventional amounts familiar to the skilled worker.

The flameproofing agent, the synergistic agent and any additives used can be incorporated by a suitable conventional mixing method, for example in an extruder, a kneader or a roll mill.

In particular, it is also possible for the components B, C, D and E of the novel molding material to be incorporated in the form of a masterbatch in the desired thermoplastic, in the form of granules or a power, into a further part of the thermoplastic, in order to achieve the intended composition.

The molding materials according to the invention can be processed by injection molding or extrusion to give self-extinguishing moldings and profiles.

In addition to being self-extinguishing, the novel molding materials possess other good properties, such as heat distortion resistance and good flow.

Surprisingly, the novel molding materials clearly contradict German Laid-Open Application No. DOS 3,025,139, in which it is stated that the use of novolaks instead of hydrocarbon/formaldehyde resins does not bring any substantial advantages over conventional prior art flameproofing treatments. In fact, comparison of the action of the novel novolaks obtained from mixtures of phenols with that of the hydrocarbon/formaldehyde resins clearly shows that the novolaks used in the novel molding materials are more effective in preventing the dripping of flaming and non-flaming particles than are the resins stated in German Laid-Open Application No. DOS 3,025,139. The comparison furthermore shows that, when the claimed novolaks are used, the content of bromine-containing flameproofing agents which is required to qualify for classification as UL 94 V0 or V1 is lower than when hydrocarbon/formaldehyde reins are used. Another substantial and surprising advantage of the treatment with novolaks compared with that using hydrocarbon/formaldehyde resins according to German Laid-Open Application No. DOS 3,025,139 is the considerable freedom in the choice of stabilizers. According to German Laid-Open Application No. DOS 3,025,139, a particularly good flame-retardant effect is achieved only in combination with sulfur and/or sulfur-containing stabilizers; this is not the case for the novel molding material which is treated with novolaks based on phenol mixtures.

The tests described in the examples and comparative experiments are carried out as follows:

The flammability test is carried out as a vertical burning test in accordance with the methods of the Underwriter's Laboratories, the purpose of the test being to classify material in one of the fire classes UL 94 V0, UL 94 V1 or UL 94 V2.

These classifications mean that, after being ignited twice with a hot flame, thermoplastics are self-extinguishing in the course of not more than 5 seconds (V0) or in the course of not more than 25 seconds (V1) and, where relevant, drip non-flaming particles. For the exact method, see (2), page 398.

The following products were prepared in order to carry out experiments and comparative experiments:

1. A Mixed Novolak 11.34 kg of o-cresol, 2.754 kg of m-cresol, 2.925 kg of p-tert.-butylphenol, 5.392 kg of formalin (37% strength in waterI, 314.6 g of oxalic acid. 2H$_2$O and 540 g of CH$_3$OH were mixed with 30 l of water, and the mixture was stirred for 24 hours at from 95° to 97° C. After 24 hours, the upper, aqueous phase was siphoned off and the lower phase was washed with 10 l of water. The lower, product-containing phase was run off, and the solvents and some of the readily volatile phenols were stripped off under reduced pressure from a water pump. The remaining melt was freed from residual phenol at 150° C. and under 0.2–0.4 mbar. The melt was cooled on a melt sheet and then comminuted and milled.

Yield: 10.3 kg

Analysis: C 80%, H 7%, O 13.3%

Molecular weight (determined by vapor pressure osmometry in acetone): 800

Name: Novolak $E_{2b1}$.

The novolak $E_{2b4}$ was prepared by a similar method, from 63.18 kg of p-cresol, 82.62 kg of m-cresol, 340.2 kg of o-cresol and 320.4 kg of formalin (40% strength in water), with the addition of 10 kg of oxalic acid and 35 kg of CH$_3$OH.

Yield: 400 kg

Molecular weight (determined by vapor pressure osmometry in acetone): 1,000.

2. A Xylene/Formaldehyde Resin

In order to carry out the comparative experiments, a low-oxygen xylene/formaldehyde resin having an oxygen content m < 1% by weight, as described in U.S. Pat. No. 4,082,728, was prepared. Investigations by nuclear resonance spectroscopy showed that the polymer contained exclusively methylene bridges and no dimethylene ether bridges (—CH$_2$OCH$_2$—).

Analysis: 0.4% of O

Molecular weight (determined by vapor pressure osmometry in toluene): 1,100

Name: XFH.

3. A Sample Novolak

In order to carry out comparative experiments, a novolak was prepared from phenol and formalin (37% strength in water), with the addition of oxalic acid (1 mol %) and methanol.

Yield: 90%, based on phenol

Molecular weight (determined by vapor pressure osmometry in acetone): 950

Name: Novolak $E_{1a}$

An o-octylphenol novolak was prepared in the same manner.

Yield: 85%, based on p-octylphenol

Molecular weight (determined by vapor pressure osmometry in acetone): 860

Name: Novolak $E_{1b}$.

The following substances were employed as typical components A, B, C, D, E and F according to the invention [abbreviations at the end, eg. (=PS), are those used in Table 2]:

A$_1$: Standard polystyrene, intrinsic viscosity IV = 119 (0.5% strength in toluene, dimethylformamide) (=PS)

A$_2$: Styrene/acrylonitrile copolymer (=SAN) containing 25% of acrylonitrile, IV = 101 (0.5% strength in dimethylformamide) (=SAN-1)

A$_{2a}$: SAN containing 35% of acrylonitrile, IV = 104 (0.5% strength in dimethylformamide) (=SAN-2)

A$_{2b}$: SAN containing 35% of acrylonitrile, IV = 80 (0.5% strength in dimethylformamide) (=SAN-3)

B$_1$: Polybutadiene rubber (=PB)

B$_{2g}$: 60% of polybutadiene rubber grafted with 40% of styrene/acrylonitrile in a ratio of 65:35 (=PB 900)

(A$_1$B$_1$): High impact polystyrene containing 8.07% of PB (=HIPS)

($A_2B_{2g}$): Toughened SAN-3 containing 20% of PB 900 (=ABS-20) and toughened SAN-3 containing 45% of PB 900 (=ABS-45)

$C_1$: Octabromodiphenyl ether (=OBDP)
$C_2$: Bis(tribromophenoxy)ethane (=BTE)
$C_3$: Tetrabromobisphenol-A (=TBA)
$D_1$: Antimony(III) oxide (=$Sb_2O_3$)
$E_{1a}$: Simple novolak obtained from phenol (=novolak $E_{1a}$)
$E_{1b}$: Simple novolak obtained from p-octylphenol (=novolak $E_{1b}$)
$E_{2b1}$: Mixed novolak obtained from 71 mol % of o-cresol + 16 mol % of m-cresol + 13 mol % of p-tert.-butylphenol (=novolak $E_{2b1}$)
$E_{2b4}$: Mixed novolak obtained from 71 mol % of o-cresol + 16 mol % of m-cresol + 13 mol % of p-cresol (=novolak $E_{2b4}$)
$E_3$: Xylene/formaldehyde resin as described in German Laid-Open Application No. DOS 3,025,139 and U.S. Pat. No. 4,082,728 (=XFH)
$F_1$: 2,6-di-tert.-butylcresol (=DBC)
$F_2$: Tris(nonylphenyl)phosphite (=TNPP)
$F_3$: Tris(2,4-di-tert.-butylphenyl)phosphite (=TDBP).

EXAMPLES 1 TO 17 AND COMPARATIVE EXPERIMENTS 18 TO 72

The examples which follow illustrate the invention. In the examples and experiments, percentages are based on the weight of the total mixture in question, unless stated otherwise.

The amounts in % by weight, stated in Table 2, of flameproofing agent (component C), synergistic agent (component D), novolak (component E) and, where relevant, further additives (component F) were mixed at 40° C. in a fluid mixer from Henschel, Kassel. The mixture of these components was then melted together with the amounts in % by weight, stated in the Table, of thermoplastic resins (component A) or toughened thermoplastic resins (components A+B) in an extruder at 230° C., and the melt was homogenized and then granulated.

TABLE 2

Examples 1 to 17 and Comparative Experiments 18 to 72

| | Components | | | | | | | | | Dripping of non- | |
|---|---|---|---|---|---|---|---|---|---|---|---|
| | A 64 Thermo- | B | C Flameproofing agent | | | D Synergistic | E Formal- | F Stabili- | Classi- | | |
| (according to the invention) | plastic resin % by weight | Elastomer % by weight | OBDP % by weight | BTE % by weight | TBA % by weight | agent $Sb_2O_3$ % by weight | dehyde resin % by weight | zer % by weight | fication according to UL 94 | flaming particles | flaming particles |
| Examples No. | HIPS | | | | | | | | | | |
| 1 | PS 75.38 | PB 6.62 | 6 | 0 | 0 | 2 | novolak $E_{2b1}$ 10 | 0 | V0 | no | no |
| 2 | PS 75.38 | PB 6.62 | 0 | 6 | 0 | 2 | novolak $E_{2b4}$ 10 | 0 | V0 | no | no |
| 3 | PS 76.12 | PB 6.68 | 0 | 2 | 3 | 2 | novolak $E_{2b1}$ 10 | TNPP 0.2 | V0 | no | no |
| | SAN | | | | | | | | | | |
| 4 | SAN-1 86 | 0 | 3 | 0 | 0 | 1 | novolak $E_{2b4}$ 10 | 0 | V1 | no | no |
| 5 | SAN-1 86 | 0 | 0 | 0 | 3 | 1 | novolak $E_{2b1}$ 10 | 0 | V0 | no | no |
| 6 | SAN-1 86 | 0 | 0 | 0 | 2.7 | 1 | novolak $E_{2b4}$ 10 | DBC 0.3 | V0 | no | no |
| 7 | SAN-2 83.5 | 0 | 5 | 0 | 0 | 1.5 | novolak $E_{2b1}$ 10 | 0 | V1 | no | no |
| 8 | SAN-2 84.5 | 0 | 0 | 0 | 4 | 1.5 | novolak $E_{2b4}$ 10 | 0 | V0 | no | no |
| 9 | SAN-2 84.5 | 0 | 0 | 0 | 3.8 | 1.4 | novolak $E_{2b4}$ 10 | TNPP 0.3 | V0 | no | no |
| 10 | SAN-3 83.5 | 0 | 5 | 0 | 0 | 1.5 | novolak $E_{2b4}$ 10 | 0 | V0 | no | no |
| 11 | SAN-3 83.5 | 0 | 0 | 2 | 3 | 1.5 | novolak $E_{2b1}$ 10 | 0 | V0 | no | no |
| | ABS-20 | | | | | | | | | | |
| 12 | SAN-3 63.2 | PB 900 15.8 | 8 | 0 | 0 | 3 | novolak $E_{2b4}$ 10 | 0 | V0 | no | no |
| 13 | SAN-3 61.6 | PB 900 15.4 | 6 | 0 | 0 | 2 | novolak $E_{2b1}$ 10 | 0 | V0 | no | no |
| 14 | SAN-3 64.4 | PB 900 16.1 | 7 | 0 | 0 | 2 | novolak $E_{2b4}$ 10 | TDBP 0.5 | V0 | no | no |
| | ABS-45 | | | | | | | | | | |
| 15 | SAN-3 45.65 | PB 900 37.35 | 0 | 0 | 5 | 2 | novolak $E_{2b4}$ 10 | 0 | V1 | no | no |
| 16 | SAN-3 43.45 | PB 900 35.55 | 0 | 4 | 3 | 2 | novolak $E_{2b4}$ 10 | 0 | V0 | no | no |
| 17 | SAN-3 43.45 | PB 900 35.55 | 8 | 0 | 0 | 3 | novolak $E_{2b1}$ 10 | 0 | V0 | no | no |
| Comparative Example | HIPS | | | | | | | | | | |
| 18 | PS 73.54 | PB 6.46 | 20 | 0 | 0 | 0 | 0 | 0 | V2 | yes | yes |
| 19 | PS 78.13 | PB 6.87 | 10 | 0 | 0 | 5 | 0 | 0 | V0 | no | no |
| 20 | PS 74.46 | PB 6.54 | 6 | 0 | 0 | 3 | novolak $E_{1a}$ 10 | 0 | none | yes | yes |
| 21 | PS | PB | 6 | 0 | 0 | 3 | XFH | 0 | none | yes | yes |

TABLE 2-continued
Examples 1 to 17 and Comparative Experiments 18 to 72

| (according to the invention) | A 64 Thermoplastic resin % by weight | B Elastomer % by weight | C Flameproofing agent OBDP % by weight | C BTE % by weight | C TBA % by weight | D Synergistic agent $Sb_2O_3$ % by weight | E Formaldehyde resin % by weight | F Stabilizer % by weight | Classification according to UL 94 | Dripping of non-flaming particles | Dripping of flaming particles |
|---|---|---|---|---|---|---|---|---|---|---|---|
| 22 | PS 74.46 | PB 6.54 | 8 | 0 | 0 | 3 | XFH 10 | 0 | none | yes | yes |
| 23 | PS 72.62 | PB 6.38 | 0 | 0 | 7.5 | 3 | 0 | 0 | none | yes | yes |
| 24 | PS 82.27 | PB 7.23 | 0 | 0 | 7.5 | 3 | novolak $E_{1b}$ 10 | 0 | none | yes | yes |
| 25 | PS 73.08 | PB 6.42 | 0 | 0 | 7.5 | 3 | XFH 10 | 0 | none | yes | yes |
| 26 | PS 73.08 | PB 6.42 | 0 | 0 | 11 | 3 | 0 | 0 | none | yes | yes |
| 27 | PS 79.05 | PB 6.95 | 0 | 0 | 11 | 3 | novolak $E_{1a}$ 6 | 0 | none | yes | yes |
| 28 | PS 73.54 | PB 6.46 | 0 | 0 | 11 | 3 | XFH 6 | 0 | none | yes | yes |
| 29 | PS 73.54 | PB 6.46 | 0 | 0 | 11 | 3 | XFH 8 | 0 | none | yes | yes |
| 30 | PS 71.7 | PB 6.3 | 0 | 0 | 11 | 3 | XFH 10 | 0 | V2 | yes | yes |
| 31 | PS 69.86 | PB 6.14 | 0 | 11 | 0 | 3 | novolak $E_{1b}$ 10 | 0 | V2 | yes | yes |
| | | SAN | | | | | | | | | |
| 32 | SAN-1 90 | 0 | 10 | 0 | 0 | 0 | 0 | 0 | V2 | yes | yes |
| 33 | SAN-1 93.5 | 0 | 5 | 0 | 0 | 1.5 | 0 | 0 | V2 | yes | yes |
| 34 | SAN-1 83.5 | 0 | 5 | 0 | 0 | 1.5 | novolak $E_{1a}$ 10 | 0 | none | yes | yes |
| 35 | SAN-1 83.5 | 0 | 5 | 0 | 0 | 1.5 | XFH 10 | 0 | none | yes | yes |
| 36 | SAN-1 94 | 0 | 0 | 0 | 6 | 0 | 0 | 0 | V2 | yes | yes |
| 37 | SAN-1 95 | 0 | 0 | 0 | 4 | 1 | 0 | 0 | V2 | yes | yes |
| 38 | SAN-1 85 | 0 | 0 | 0 | 4 | 1 | novolak $E_{1b}$ 10 | 0 | none | yes | yes |
| 39 | SAN-1 85 | 0 | 0 | 0 | 4 | 1 | XFH 10 | 0 | none | yes | yes |
| 40 | SAN-1 82.5 | 0 | 0 | 6 | 0 | 1.5 | XFH 10 | 0 | V2 | yes | yes |
| 41 | SAN-3 88 | 0 | 12 | 0 | 0 | 0 | 0 | 0 | V2 | yes | yes |
| 42 | SAN-3 | 0 | 8 | 0 | 0 | 1.5 | 0 | 0 | V1 | yes | no |
| 43 | SAN-3 81.5 | 0 | 8 | 0 | 0 | 1.5 | XFH 10 | 0 | V2 | yes | yes |
| 44 | SAN-3 81.5 | 0 | 8 | 0 | 0 | 1.5 | novolak $E_{1b}$ 10 | 0 | V2 | yes | yes |
| 45 | SAN-3 88 | 0 | 8 | 2 | 0 | 2 | 0 | 0 | V0 | yes | no |
| 46 | SAN-3 78 | 0 | 8 | 2 | 0 | 2 | XFH 10 | 0 | V0 | yes | no |
| 47 | SAN-3 78 | 0 | 8 | 2 | 0 | 2 | novolak $E_{1a}$ 10 | 0 | V1 | yes | no |
| 48 | SAN-3 90 | 0 | 0 | 0 | 10 | 0 | 0 | 0 | V2 | yes | yes |
| 49 | SAN-3 92 | 0 | 0 | 0 | 6 | 2 | 10 | 0 | V2 | yes | yes |
| 50 | SAN-3 | 0 | 0 | 0 | 6 | 2 | XFH 10 | 0 | V2 | yes | yes |
| 51 | SAN-2 84 | 0 | 16 | 0 | 0 | 0 | 0 | 0 | V2 | yes | yes |
| 52 | SAN-2 87 | 0 | 10 | 0 | 0 | 3 | 0 | 0 | V1 | yes | no |
| 53 | SAN-2 80 | 0 | 8 | 0 | 0 | 2 | novolak $E_{1a}$ 10 | 0 | V2 | yes | yes |
| 54 | SAN-2 | 0 | 8 | 0 | 0 | 2 | novolak $E_{1a}$ 10 | 0 | V2 | yes | yes |
| | | ABS-20 | | | | | | | | | |
| 55 | SAN-3 64 | PB 900 16 | 20 | 0 | 0 | 0 | 0 | 0 | V1 | yes | no |
| 56 | SAN-3 63.2 | PB 900 15.8 | 16 | 0 | 0 | 5 | 0 | 0 | V1 | yes | no |
| 57 | SAN-3 | PB 900 | 10 | 0 | 0 | 4 | XFH | 0 | V1 | yes | no |

TABLE 2-continued

Examples 1 to 17 and Comparative Experiments 18 to 72

| (according to the invention) | A 64 Thermoplastic resin % by weight | B Elastomer % by weight | C Flameproofing agent OBDP % by weight | C Flameproofing agent BTE % by weight | C Flameproofing agent TBA % by weight | D Synergistic agent Sb$_2$O$_3$ % by weight | E Formaldehyde resin % by weight | F Stabilizer % by weight | Classification according to UL 94 | Dripping of non-flaming particles | Dripping of flaming particles |
|---|---|---|---|---|---|---|---|---|---|---|---|
| 58 | SAN-3 60.8 | PB 900 15.2 | 10 | 0 | 0 | 4 | novolak E$_{1a}$ 10 | 0 | V2 | yes | yes |
| 59 | SAN-3 60.8 | PB 900 15.2 | 15 | 0 | 0 | 4 | XFH 8 | 0 | V0 | yes | no |
| 60 | SAN-3 58.4 | PB 900 14.6 | 0 | 0 | 25 | 0 | 0 | 0 | V1 | yes | no |
| 61 | SAN-3 60 | PB 900 15 | 0 | 0 | 18 | 4 | 0 | 0 | V1 | yes | no |
| 62 | SAN-3 62.4 | PB 900 15.6 | 0 | 0 | 12 | 4 | XFH 10 | 0 | V1 | yes | no |
| 63 | SAN-3 59.2 | PB 900 14.8 | 0 | 0 | 12 | 4 | novolak E$_{1b}$ 10 | 0 | V1 | yes | no |
|  | SAN-3 59.2 | ABS-45 14.8 |  |  |  |  |  |  |  |  |  |
| 64 | SAN-3 44 | PB 900 36 | 20 | 0 | 0 | 0 | 0 | 0 | V1 | yes | no |
| 65 | SAN-3 43.45 | PB 900 35.55 | 16 | 0 | 0 | 5 | 0 | 0 | V0 | no | no |
| 66 | SAN-3 41.8 | PB 900 34.2 | 10 | 0 | 0 | 4 | novolak E$_{1a}$ 10 | 0 | none | yes | yes |
| 67 | SAN-3 41.25 | PB 900 33.75 | 10 | 0 | 0 | 4 | novolak E$_{1a}$ 10 | TNPP 1 | none | yes | yes |
| 68 | SAN-3 41.8 | PB 900 34.2 | 10 | 0 | 0 | 4 | XFH 10 | 0 | none | yes | yes |
| 69 | SAN-3 41.25 | PB 900 33.75 | 10 | 0 | 0 | 4 | XFH 10 | TNPP 1 | none | yes | yes |
| 70 | SAN-3 44 | PB 900 36 | 0 | 0 | 20 | 0 | 0 | 0 | none | yes | yes |
| 71 | SAN-3 39.6 | PB 900 32.4 | 0 | 0 | 14 | 4 | novolak E$_{1b}$ 10 | 0 | none | yes | yes |
| 72 | SAN-3 39.6 | PB 900 32.4 | 0 | 0 | 14 | 4 | XFH 10 | 0 | none | yes | yes |

We claim:

1. A flameproofed thermoplastic molding material, comprising
   A. one or more thermoplastic resins containing a vinyl-aromatic monomer,
   and furthermore contains
   B. from 0 to 100 parts by weight of one or more elastomers having a glass transition temperature Tg<0° C., as an impact modifier,
   C. from 2 to 50 parts by weight of one or more halogen-containing organic compounds (flameproofing agents),
   D. from 0.5 to 20 parts by weight of a member selected from the group consisting of As$_2$O$_3$, Sb$_2$O$_3$, Bi$_2$O$_3$, SnO$_2$, Fe$_2$O$_3$, ferrocene, Al$_2$O$_3$, ZnO, hypophosphites, borates and mixtures thereof (synergistic agents with component C) and
   E. from 5 to 50 parts by weight of a novolak (phenol-/aldehyde resin),
the amounts in each case being based on 100 parts by weight of A, wherein the novolak used has a number average molecular weight $\overline{M}_n$ of from 500 to 2000 and is obtainable from an aldehyde of the formula (I)

$$R^1\text{—CHO} \tag{I}$$

where R$^1$ is H, C$_1$–C$_{10}$-alkyl, cycloalkyl, C$_6$–C$_{12}$-aryl or ω-aryl-C$_1$–C$_3$-alkyl, and a mixture of phenols, and this mixture contains two or more monosubstituted phenols and the substituents can be alkyl of 1 to 8 carbon atoms or CN.

2. A flameproofed thermoplastic molding material, comprising
   A. one or more thermoplastic resins which contain, as copolymerized units, styrene or a styrene which is alkylated in the nucleus or a mixture of these,
   and furthermore comprises
   B. from 0 to 100 parts by weight of one or more elastomers having a glass transition temperature Tg<0° C., as an impact modifier,
   C. from 2 to 50 parts by weight of one or more halogen-containing organic compounds (flameproofing agents),
   D. from 0.5 to 20 parts by weight of a member selected from the group consisting of As$_2$O$_3$, Sb$_2$O$_3$, Bi$_2$O$_3$, SnO$_2$, Fe$_2$O$_3$, ferrocene, Al$_2$O$_3$, ZnO, hypophosphites borates and mixtures thereof (synergistic agents with component C) and
   E. from 5 to 50 parts by weight of a novalak (phenol-/aldehyde resin),
the amounts in each case being based on 100 parts by weight of A, wherein the novalak used has a number average molecular weight $\overline{M}_n$ of from 500 to 2000 and is obtainable from an aldehyde of the formula (I)

$$R^1\text{—CHO} \tag{I}$$

where R$^1$ is H, C$_1$–C$_{10}$-alkyl, cycloalkyl, C$_6$–C$_{12}$-aryl or ω-aryl-C$_1$–C$_3$-alkyl, and a mixture of phenols, and this mixture contains two or more monosubstituted phenols and the substituents can be alkyl of 1 to 8 carbon atoms or CN.

3. A flameproofed thermoplastic molding material as defined in claim 2, comprising
  A. One or more thermoplastic resins which contain, as copolymerized units, styrene or a styrene which is alkylated in the nucleus, or a mixture of these,
and furthermore comprises
  B. from 5 to 30 parts by weight of an elastomer having a glass transition temperature Tg<0° C., as an impact modifier, in the form of a graft copolymer of the monomers of which component A consists,
  C. from 2 to 50 parts by weight of one or more halogen-containing organic compounds (flameproofing agents),
  D. from 0.5 to 20 parts by weight of a member selected from the group consisting of $As_2O_3$, $Sb_2O_3$, $Bi_2O_3$, $SnO_2$, $Fe_2O_3$, ferrocene, $Al_2O_3$, ZnO, hypophosphites borates and mixtures thereof (synergistic agents with component C) and
  E. from 5 to 50 parts by weight of a novolak (phenol/aldehyde resin),
the amounts in each case being based on 100 parts by weight of A, wherein the novolak used has a number average molecular weight $\overline{M}_n$ of from 500 to 2000 and is obtainable from an aldehyde of the formula (I)

$$R^1\text{—CHO} \qquad (I)$$

where $R^1$ is H, $C_1$–$C_{10}$-alkyl, cycloalkyl, $C_6$–$C_{12}$-aryl or $\omega$-aryl-$C_1$–$C_3$-alkyl, and a mixture of phenols, and this mixture contains two or more monosubstituted phenols and the substituents can be alkyl of 1 to 8 carbon atoms or CN.

4. A flameproofed thermoplastic molding material, comprising
  A. one or more thermoplastic resins which contain, as copolymerized units, from 50 to 99% by weight of styrene or a styrene which is alkylated in the nucleus, or a mixture of these, and from 1 to 50% by weight of acrylonitrile,
and furthermore contains
  B. from 0 to 100 parts by weight of one or more elastomers having a glass transition temperature Tg≦0° C., as an impact modifier,
  C. from 2 to 50 parts by weight of one or more halogen-containing organic compounds (flameproofing agents),
  D. from 0.5 to 20 parts by weight of a member selected from the group consisting of $As_2O_3$, $Sb_2O_3$, $Bi_2O_3$, $SnO_2$, $Fe_2O_3$, ferrocene, $Al_2O_3$, ZnO, hypophosphites borates and mixtures thereof (synergistic agents with component C) and
  E. from 5 to 50 parts by weight of a novolak (phenol/aldehyde resin),
the amounts in each case being based on 100 parts by weight of A, wherein the novolak used has a number average molecular weight $\overline{M}_n$ of from 500 to 2000 and is obtainable from an aldehyde of the formula (I)

$$R^1\text{—CHO} \qquad (I)$$

where $R^1$ is H, $C_1$–$C_{10}$-alkyl, cycloalkyl, $C_6$–$C_{12}$-aryl or $\omega$-aryl-$C_1$–$C_3$-alkyl, and a mixture of phenols, and this mixture contains two or more monosubstituted phenols and the substituents can be alkyl of 1 to 8 carbon atoms or CN.

5. A flameproofed thermoplastic molding material as defined in claim 4, comprising
  A. one or more thermoplastic resins which contain, as copolymerized units, from 50 to 99% by weight of styrene or a styrene which is alkylated in the nucleus, or a mixture of these, and from 1 to 50% by weight of acrylonitrile,
and furthermore comprises
  B. from 50 to 30 parts by weight of one or more elastomers having a glass transition temperature Tg<0° C., as an impact modifier, in the form of a graft copolymer of the monomers of which component A consists,
  C. from 2 to 50 parts by weight of one or more halogen-containing organic compounds (flameproofing agents),
  D. from 0.5 to 20 parts by weight of a member selected from the group consisting of $As_2O_3$, $Sb_2O_3$, $Bi_2O_3$, $SnO_2$, $Fe_2O_3$, ferrocene, $Al_2O_3$, ZnO, hypophosphites borates and mixtures thereof (synergistic agents with component C) and
  E. from 5 to 50 parts by weight of a novolak (phenol/aldehyde resin),
the amounts in each case being based on 100 parts by weight of A, wherein the novolak used has a number average molecular weight $\overline{M}_n$ of from 500 to 2000 and is obtainable from an aldehyde of the formula (I)

$$R^1\text{—CHO} \qquad (I)$$

where $R^1$ is H, $C_1$–$C_{10}$-alkyl, cycloalkyl, $C_6$–$C_{12}$-aryl or $\omega$-aryl-$C_1$–$C_3$-alkyl, and a mixture of phenols, and this mixture contains two or more monosubstituted phenols and the substituents can be alkyl of 1 to 8 carbon atoms or CN.

6. A flameproofed thermoplastic molding material, comprising
  A. one or more thermoplastic resins which contain, as copolymerized units, from 50 to 99% by weight of styrene or a styrene which is alkylated in the nucleus, or a mixture of these, and from 1 to 50% by weight of acrylonitrile,
and furthermore comprises
  B. from 5 to 30 parts by weight of polybutadiene, or of a rubber containing not less than 50% by weight of acrylates, as an impact modifier, in the form of a graft copolymer of the monomers of which component A consists,
  C. from 2 to 50 parts by weight of one or more halogen-containing organic compounds (flameproofing agents),
  D. from 0.5 to 20 parts by weight of a member selected from the group consisting of $As_2O_3$, $Sb_2O_3$, $Bi_2O_3$, $SnO_2$, $Fe_2O_3$, ferrocene, $Al_2O_3$, ZnO, hypophosphites borates and mixtures thereof (synergistic agents with component C) and
  E. from 5 to 50 parts by weight of a novolak (phenol/aldehyde resin),
wherein the novolak used has a number average molecular weight $\overline{M}_n$ of from 500 to 2000 and is obtainable from an aldehyde of the formula (I)

$$R^1\text{—CHO} \qquad (I)$$

where $R^1$ is H, $C_1$–$C_{10}$-alkyl, cycloalkyl, $C_6$–$C_{12}$-aryl or $\omega$-aryl-$C_1$–$C_3$-alkyl, and a mixture of phenols, and this mixture contains two or more monosubstituted phenols and the substituents can be alkyl of 1 to 8 carbon atoms or CN.

7. A molding material as defined in claim 1, wherein the novolak used is obtained from formaldehyde and a mixture of phenols.

8. A molding material as defined in claim 1, wherein the novolak used is obtained from a phenol mixture which contains from 20 to 80 mol % of o-cresol, from 10 to 40 mol % of m-cresol and from 10 to 40 mol % of p-tert.-butylphenol or p-cresol, the percentages in each case being based on the total mixture.

9. The composition of claim 1, wherein component D is $Sb_2O_3$.

10. The composition of claim 2, wherein component D is $Sb_2O_3$.

11. The composition of claim 3, wherein component D is $Sb_2O_3$.

12. The composition of claim 4, wherein component D is $Sb_2O_3$.

13. The composition of claim 5, wherein component D is $Sb_2O_3$.

14. The composition of claim 6, wherein component D is $Sb_2O_3$.

15. The composition of claim 7, wherein component D is $Sb_2O_3$.

16. The composition of claim 8, wherein component D is $Sb_2O_3$.

* * * * *